US009753469B2

(12) United States Patent
McCollough

(10) Patent No.: US 9,753,469 B2
(45) Date of Patent: Sep. 5, 2017

(54) ENERGY HARVESTING DEVICE

(71) Applicant: Electric Power Research Institute Inc., Palo Alto, CA (US)

(72) Inventor: Norman D. McCollough, Melbourne, FL (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 15/386,024

(22) Filed: Dec. 21, 2016

(65) Prior Publication Data

US 2017/0199533 A1 Jul. 13, 2017

Related U.S. Application Data

(60) Provisional application No. 62/277,219, filed on Jan. 11, 2016.

(51) Int. Cl.

| | |
|---|---|
| ***H01F 30/12*** | (2006.01) |
| ***G05F 1/335*** | (2006.01) |
| ***G05F 1/325*** | (2006.01) |
| ***H01F 38/34*** | (2006.01) |
| *H02M 7/217* | (2006.01) |
| *H01F 38/30* | (2006.01) |

(52) U.S. Cl.

CPC .............. *G05F 1/335* (2013.01); *G05F 1/325* (2013.01); *H01F 38/34* (2013.01); *H01F 2038/305* (2013.01)

(58) Field of Classification Search

CPC ........ H02M 7/217; H01F 17/03; H01F 17/04; H01F 19/00; H01F 27/00; H01F 27/28; H01F 30/00; H01F 30/06; H01F 30/12

See application file for complete search history.

(56) References Cited

U.S. PATENT DOCUMENTS

| | | | | |
|---|---|---|---|---|
| 3,007,106 A * | 10/1961 | Bergh | .................... | G01R 19/20 323/358 |
| 3,305,800 A * | 2/1967 | Velsink | .................... | H01F 19/04 323/358 |
| 6,028,422 A * | 2/2000 | Preusse | ................. | H01F 27/427 323/357 |
| 7,579,757 B2 | 8/2009 | Kulah et al. | | |
| 7,812,771 B2 | 10/2010 | Greene et al. | | |

(Continued)

*Primary Examiner* — Gary L Laxton

(74) *Attorney, Agent, or Firm* — Curatolo Sidoti Co., LPA; Joseph G. Curatolo; Vincent A. Cortese

(57) ABSTRACT

A device for harvesting energy from a power line carrying AC current including: a transformer having a core with separate first and second sections, the core being formed of ceramic material or layered nickel alloy tape; a first secondary winding wound around the first section of the core; a second secondary winding wound around the second section of the core; a first DC core-flux control winding wound around the first section of the core; and a second DC core-flux control winding wound around the second section of the core; wherein the core is configured to be in operative communication with a magnetic field radiated from the power line, such that an AC voltage is generated in the first and second secondary windings, and the maximum AC voltage produced by the first and second secondary windings is limited by the first and second DC core-flux control windings.

12 Claims, 3 Drawing Sheets

(56) References Cited

U.S. PATENT DOCUMENTS

| | | | | |
|---|---|---|---|---|
| 7,837,807 | B2 * | 11/2010 | Yoshizawa | C22C 38/002 148/303 |
| 8,035,335 | B2 | 10/2011 | Duron et al. | |
| 8,588,887 | B2 | 11/2013 | Arneson et al. | |
| 2008/0239763 | A1 | 10/2008 | McCollough | |
| 2010/0084920 | A1 * | 4/2010 | Banting | G01R 15/142 307/66 |

* cited by examiner

ENERGY HARVESTING DEVICE

This application claims the benefit of the filing date under 35 U.S.C. §119(e) from U.S. Provisional Application for Patent Ser. No. 62/277,219, filed on Jan. 11, 2016, which is incorporated herein by reference as if fully written out below.

Provided are energy harvesting devices including a high-inductance split-core power transformer in which a primary winding thereof is formed by an electric utility power line.

An electrical power grid includes various power generators, which generate AC (alternating current) that is carried over long distances by interconnected electric utility power transmission and/or distribution lines, referred to herein collectively as "power line(s)", which term is intended to include any electrical lines which transmit/conduct power between electric utility apparatus and/or to end users. The power lines supply the generated power to various local power sub-stations, which operate to format the power for further distribution to end users at various electrical outlets or receptacles. Due to the concern for the operating health of the components of the power grid, efforts have been made to add sensors to strategic areas of the electrical power grid to monitor various operating assets and their parameters to ensure that the power grid is operating within acceptable performance guidelines and/or rapidly report outage locations.

In particular, power grid sensors utilize many complex technologies, which may consume a substantial amount of power. For example, such power grid sensors may include embedded micro-controllers for processing collected power grid operating performance data, as well as, wireless communication devices, such as cellular and/or satellite communication devices, to transmit the collected operating performance data to a remote computer for aggregation and analysis.

Unfortunately, the power requirements of such power grid sensors may exceed the power that is able to be harvested from the magnetic fields radiated from the power lines which result from the normal consequence of transmitting power through the power lines. Furthermore, conventional energy harvesting devices, which sought to harness the power of the radiated magnetic field of the power line, utilized an iron transformer core, which has low magnetic permeability and hence low inductance. This required that the power line carry substantially high electrical currents, such as 10-40 amps, in order for the energy harvesting device to generate an acceptable amount of power to operate the power grid sensors. However, such high electrical current requirements make the use of such iron core energy harvesting devices impractical. Furthermore, such iron cores may be susceptible to oxidation, preventing close contact of the core mating surfaces, thereby causing failure. Because conventional energy harvesting devices have not been commercially viable, power grid sensors may typically be powered by batteries or solar cells.

What is needed are energy harvesting devices capable of harvesting power from the radiated magnetic field of a power line, in order to power an electronic device, such as a power grid sensor. While one focus of the present subject matter is power grid sensors, such energy harvesting devices may be used to power any device or apparatus, such as an electric car. Such energy harvesting devices may also be capable of harvesting power from the radiated magnetic field of a power line which carries AC electrical currents as low as about 1 amp. Such energy harvesting devices may also be capable of harvesting power from the radiated magnetic field of a power line to power various power grid sensors, including but not limited to current sensors, voltage sensors, and/or thermal sensors, as well as power grid sensors utilizing wireless communication devices, such as cellular, satellite or radio frequency communication devices.

In light of the foregoing, provided are energy harvesting devices including a transformer having a split core, optionally formed of sintered $MnZnFe_2O_3$ or unsintered nickel alloy, wherein the transformer includes a primary winding formed of a power line, one or more secondary windings, and one or more DC core-flux control windings. In certain embodiments, the core of the energy harvesting device may include two secondary windings and two DC core-flux control windings. In certain embodiments, the nickel alloy may be an alloy consisting of about 80% nickel, 6% molybdenum and 14% iron.

Embodiments of the subject matter are disclosed with reference to the accompanying drawings and are for illustrative purposes only. The subject matter is not limited in its application to the details of construction or the arrangement of the components illustrated in the drawings. Like reference numerals are used to indicate like components, unless otherwise indicated.

Figure 1:
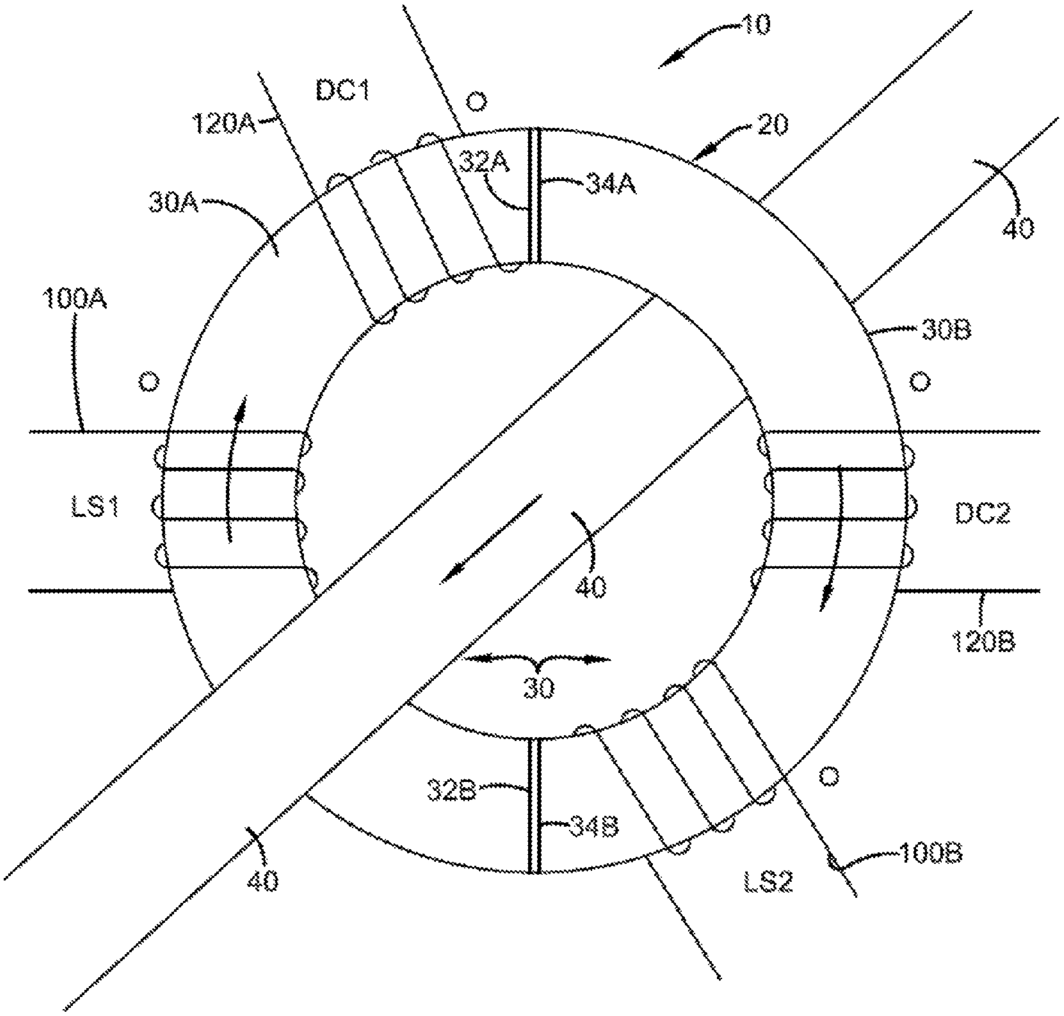
FIG. 1 is a perspective view of a power transformer provided by an energy harvesting device in accordance with the subject technology.
Figure 2:
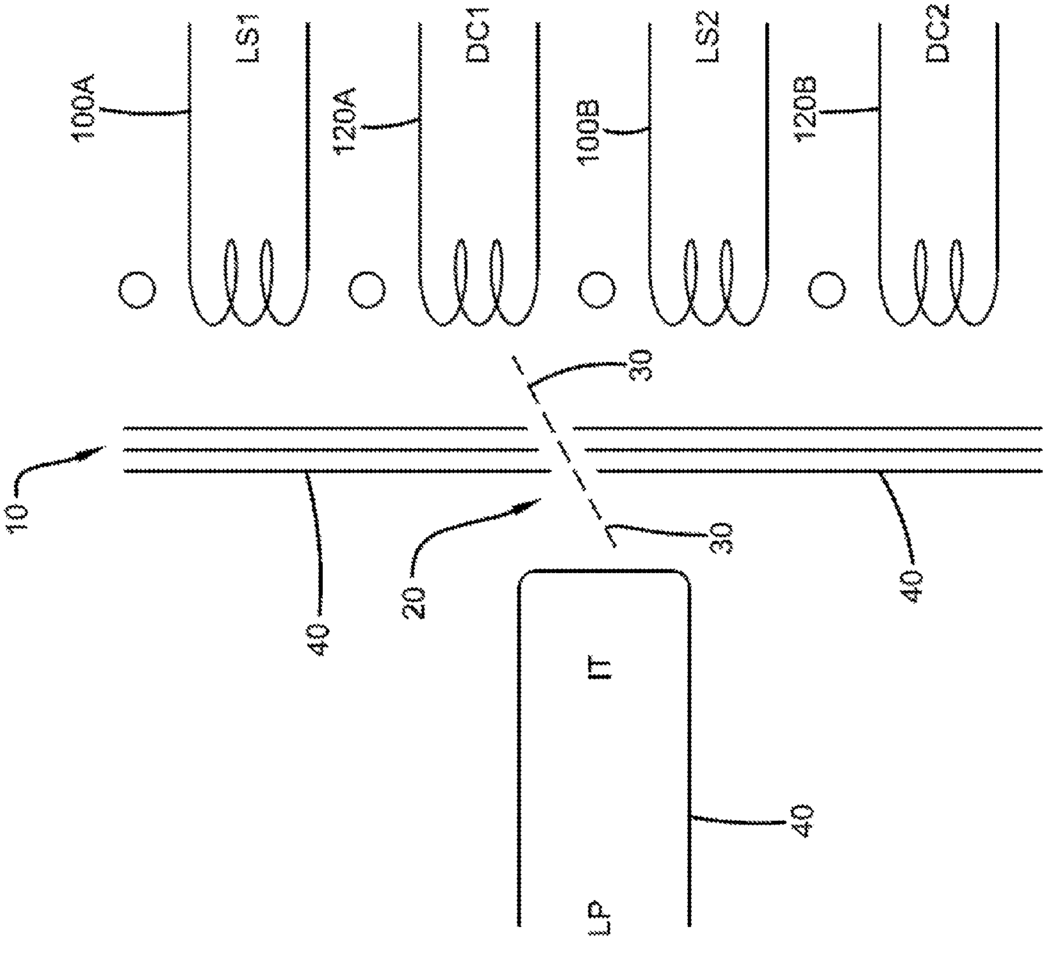
FIG. 2 is a schematic view of a power transformer provided by an energy harvesting device in accordance with the subject technology.

An energy harvesting device as described herein is generally referred to by numeral 10, as shown in FIGS. 1 and 2 of the drawings. The energy harvesting device 10 includes a power transformer 20 that includes a split-core 30, which is formed of any suitable number of removable core sections, such as core section 30A and core section 30B. As such, the split-core 30 is capable of being disassembled into its separate core sections 30A and 30B to facilitate its attachment around or about a power line 40, as shown in FIG. 1. Thus, the core section 30A includes terminal faces 32A and 32B and core section 30B includes terminal faces 34A and 34B, whereby the complete core 30 is assembled when the faces 32A and 34A are positioned adjacent to each other and faces 32B and 34B are positioned adjacent to each other, as shown in FIG. 1. In addition, the split-core 30 may be formed in any suitable shape, such as toroid, EE, EI, or CC.

The transformer 20 of the energy harvesting device 10 comprises a high-inductance transformer, in which the split core 30 is formed of a material that has high relative magnetic permeability, such as a relative magnetic permeability of at least about 30,000, such as a metal, metal alloy, and/or ceramic material. In some embodiments, the core material may have a relative magnetic permeability of at least about 50,000. In some embodiments, the core material may have a relative magnetic permeability of about 30,000 to about 80,000. In some embodiments, the core material may have a relative magnetic permeability of about 50,000 to about 80,000. In some embodiments, the material used to form the core 30 may comprise a material having a magnetic inductance of about 1 henry, although different materials of inductance values may be used.

In one embodiment, the split core 30 may be formed of a ceramic material, such as sintered $MnZnFe_2O_3$, which provides an initial relative magnetic permeability of about 30,000 or more. Furthermore, in other embodiments, the sintered $MnZnFe_2O_3$ material which may form the core 30 may be sintered in a magnetic field to enhance material permeability. In other embodiments, the $MnZnFe_2O_3$ material may be formed as follows: Mn, Zn and $Fe_2O_3$ are ground to sub-micron particle sizes, mixed and pressed under pressure, such as about 500 to about 1000 tons, into any suitable shape, such as a toroid, and then sintered. In some embodiments, the pressed core 30 may be sintered in a magnetic field.

In other embodiments, the split core 30 may be formed of nickel alloy, whereby multiple thin layers of nickel alloy tape are wound and optionally pressed and/or optionally annealed to form the core 30, such as a toroid core. This configuration of the split core 30 may achieve a relative magnetic permeability of about 50,000 or more.

In addition to the split-core 30, the transformer 20 also includes a single-turn (np=1) primary winding, which is formed by the power line 40 itself. The transformer 20 also includes two secondary windings that are wound around the core 30, which includes a first secondary winding 100A and a second secondary winding 100B. However, it should be appreciated that the transformer 20 may utilize any number of secondary windings. The first and second secondary winding 100A and 100B each include one or more turns (ns≥1). In certain illustrative embodiments, the first secondary winding 100A and/or the second secondary winding 100B may comprise about 80 turns. It should also be appreciated that the secondary windings 100A and 100B are wound around the core 30, such that the first secondary winding 100A is wound around the core section 30A and the second secondary winding 100B is wound around the core section 30B.

In order to control and regulate the core-flux and magnetic saturation of the transformer core 30 on each of the two core sections 30A and 30B, two DC (direct current) core-flux control windings are wound around the core 30. For example, in some embodiments, a first DC core-flux control winding 120A is wound around the core section 30A and a second DC core-flux control winding 120B is wound around the core section 30B. The first and second DC core-flux control windings 120A and 120B each include one or more turns (nc≥1). In certain illustrative embodiments, the first DC core-flux control winding and/or the second DC core-flux control winding may comprise about 80 turns.

The DC core-flux control windings 120A and 120B serve to complete the DC magnetic circuit, and utilize oppositely wound/wired DC windings to saturate the core sections 30A and 30B according to the AC current magnitude of the cycle of the AC signal that is carried by the primary winding 40. That is, as the AC current carried by the primary winding 40 approaches a positive peak in the AC cycle, the DC winding 120A/120B on the associated core section 30A/30B operates to bias the core 30 so that the amount of voltage produced in the associated secondary winding 100A/100B does not exceed a desired limit. Furthermore, as the AC current carried by the primary winding 40 approaches a negative peak in the AC cycle, the DC winding 120A/120B on the associated core section 30A/30B is wired so as to saturate the core 30 as more voltage is produced in the associated secondary winding 100A/100B. It should be appreciated that the two DC core-flux control windings 120A and 120B may be wired such that no AC voltage is produced when the windings are connected in series with opposite polarity.

Figure 3:
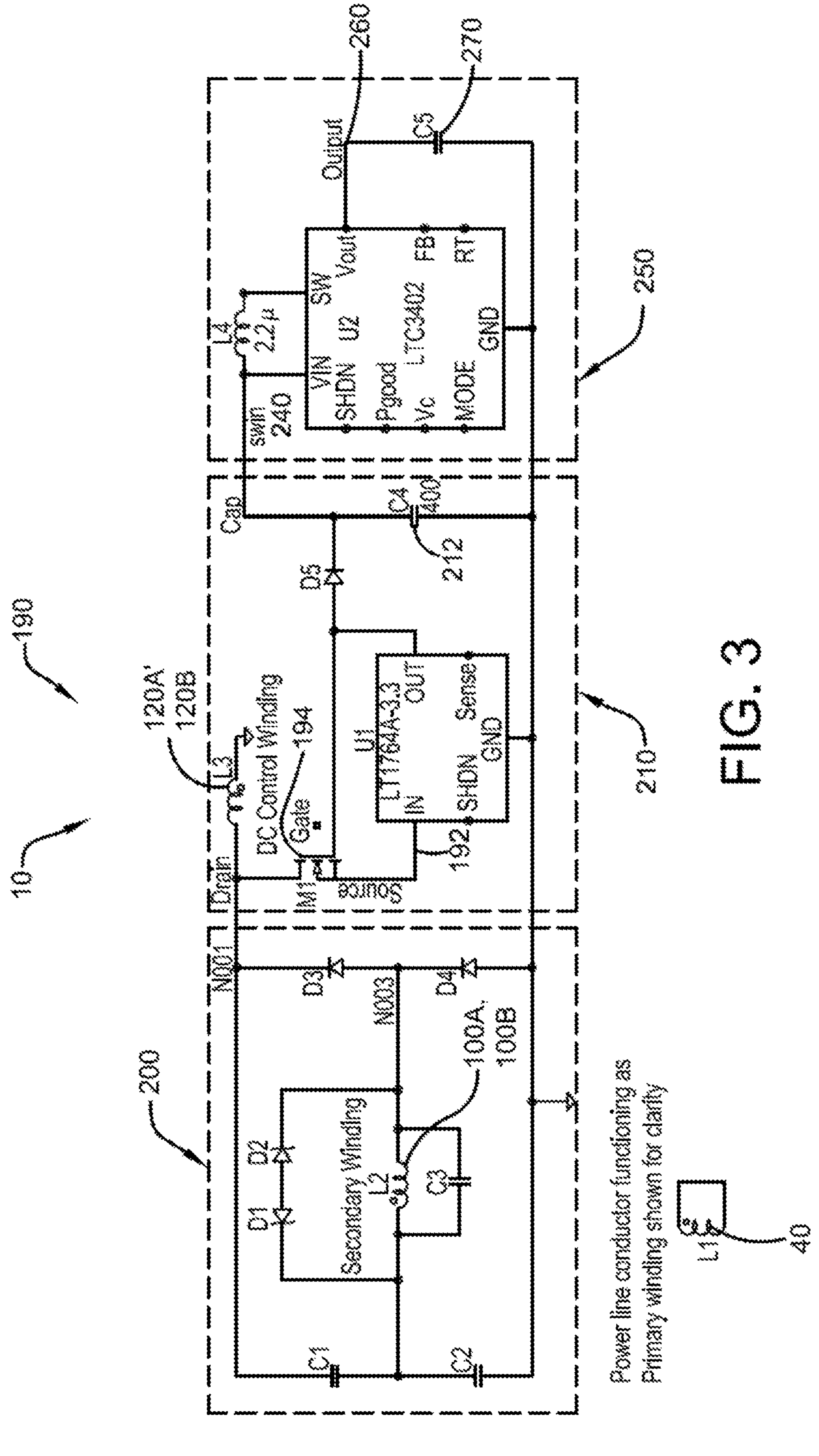
FIG. 3 is a schematic view of a power conversion circuit, which may be operatively coupled to the power transformer of the energy harvesting device in accordance with the subject technology.

Now referring to FIG. 3, the energy harvesting device 10 also includes a power conversion circuit 190, which is coupled to the secondary windings 100A and 100B and to the DC core-flux control windings 120A and 120B. The power conversion circuit 190 includes a rectification circuit 200, which converts the AC (alternating current) power generated at the secondary windings 100A and 100B into DC (direct current) power.

Rectification circuit 200 may be a resonant frequency voltage doubling rectification circuit. The DC (direct current) output of the rectification circuit 200 is delivered to an input 192 of a voltage regulator 210 through a FET (field effect transistor) 194, such as a depletion mode FET transistor. In some embodiments, the input of the voltage regulator may be from about 1 VDC to about 1000 VDC. The first and second DC core-flux control windings 120A and 120B are coupled to the drain (D) terminal of the FET 194 or other suitable switch provided at the input of the voltage regulator 210. The DC core-flux control windings 120A and 120B operate to complete the DC magnetic circuit of the core 30, and saturate the core sections 30A and 30B according to the AC primary current magnitude of the cycle of the AC signal that is carried by the primary winding 40, so as to control the voltage output by the secondary windings 100A and 100B as previously discussed. It should be appreciated that the voltage regulator 210 may comprise any suitable voltage regulator circuit. The output of the voltage regulator 210 across a capacitor 212 may be about 2.5 V at 3 A, for example.

The output of the voltage regulator 210 is delivered to an input 240 of a DC to DC converter 250, which operates to adjust or modify the magnitude of the DC voltage output from the voltage regulator 210. The voltage supplied at the output 260 of the converter 250 may be set or adjusted at any suitable output voltage, such as 3-5 VDC. In some embodiments, the voltage supplied at the output 260 of the DC to DC converter may be stored in a capacitor 270, such as a super capacitor, which enables the continued, uninterrupted powering of any suitable load coupled to the output 260, such as a power grid sensor, or any other electronic device, when a power outage associated with a fault condition is experienced at the power line 40.

It should be appreciated that during operation of the harvesting device 10, the electrical current through the power line 40 may range from about 1 amp to about 27,000 amps, typically at a frequency of about 50 Hz or about 60 Hz. In certain embodiments, by use of the DC core-flux control windings, the transformer as described herein may regulate the output voltage from the transformer to safe levels, which may protect any devices powered by the transformer from electrical damage.

In some embodiments, the power harvesting device 10, which includes the power transformer 20 and the power conversion circuit 190, may be carried in a rugged housing (i.e. a power module housing) and directly mounted around the power line. In addition, the output 260 of the power conversion circuit 190 may be configured to have any suitable modular or standardized/proprietary connection interface, such as USB (universal serial bus), which allows for the attachment and removal of a variety of electronic devices to be electrically coupled thereto. Accordingly, the power harvesting device 10 may be used to power any electronic device electrically coupled to the output 260, which have a compatible connection interface for coupling to the connection interface of the power module housing.

Electronic devices which may be coupled to or powered by the power harvesting device 10 include, but are not limited to, various power grid sensors, such as current, voltage, thermal, and/or harmonic sensors, as well as faulted circuit sensors, and/or arc or partial discharge sensors.

It will be understood that the embodiments described herein are merely exemplary, and that one skilled in the art may make variations and modifications without departing from the spirit and scope of the subject technology. All such variations and modifications are intended to be included within the scope of the subject technology as described hereinabove. Further, all embodiments disclosed are not necessarily in the alternative, as various embodiments of the subject technology may be combined to provide the desired result.

What is claimed is:

1. A device for harvesting energy from a power line carrying AC current comprising:

- a transformer having a core with separate first and second sections, with the core being formed of ceramic or metal alloy material having a relative magnetic permeability of at least about 30,000;
- a first secondary winding wound around the first section of the core;
- a second secondary winding wound around the second section of the core;
- a first DC core-flux control winding wound around the first section of the core; and
- a second DC core-flux control winding wound around the second section of the core;
- wherein the core is configured to be in operative communication with a magnetic field radiated from the power line, such that an AC voltage is generated in the first and second secondary windings, and the maximum AC voltage produced by the first and second secondary windings is limited by the first and second DC core-flux control windings.

2. The device of claim 1, wherein the core has a relative magnetic permeability of at least about 50,000.

3. The device of claim 1, wherein the ceramic material is sintered $MnZnFe_2O_3$.

4. The device of claim 1, wherein the metal alloy material is a nickel alloy, optionally a layered nickel alloy tape.

5. The device of claim 4, wherein the nickel alloy is an alloy consisting of about 80% nickel, 6% molybdenum and 14% iron.

6. The device of claim 1, wherein the core comprises a toroidal shape, an EE shape, an EI shape, or a CC shape.

7. The device of claim 1, wherein the power line comprises a primary winding of the core.

8. The device of claim 7, wherein the primary winding has one turn with respect to the core.

9. The device of claim 1, further comprising a power conversion circuit coupled to the first and second secondary windings and coupled to the first and second DC core-flux control windings,

- wherein the power conversion circuit converts the AC voltage output by the first and second secondary windings into a DC voltage, and
- wherein the power conversion circuit controls the magnitude of the AC voltage generated in the first and second secondary windings based on the magnitude of the AC current carried in the power line.

10. The device of claim 9, further comprising an energy storage super capacitor coupled to an output of the power conversion circuit.

11. The device of claim 9, wherein the power conversion circuit comprises:

- a rectification circuit coupled to the first and second secondary windings;
- a voltage regulator coupled to an output of the rectification circuit; and
- a DC-to-DC converter coupled to the output of the voltage regulator.

12. The device of claim 11, further comprising an energy storage super capacitor coupled to an output of the DC-to-DC converter.

* * * * *